Feb. 18, 1969  G. GRÖTSCH  3,428,105
PNEUMATIC TIRES FOR VEHICLES WITH NON-SKID MEMBERS
Filed June 27, 1966

INVENTOR
GEORG GROTSCH
BY Glascock, Downing +
Seebold ATTORNEYS

United States Patent Office 3,428,105
Patented Feb. 18, 1969

3,428,105
PNEUMATIC TIRES FOR VEHICLES WITH
NON-SKID MEMBERS
Georg Grötsch, Bad Kohlgrub, Germany, assignor of one-half to Richard Bergner, Schwabach, near Nuremberg, Germany, a firm
Filed June 27, 1966, Ser. No. 560,591
Claims priority, application Germany, June 28, 1965, G 44,004; Oct. 16, 1965, G 44,964
U.S. Cl. 152—210     8 Claims
Int. Cl. B60c 11/16

ABSTRACT OF THE DISCLOSURE

An anti-skid spike for insertion in a suitable hole in the tread of a pneumatic tire so as to protrude radially therefrom, the stud being either of hard metal or having a hard metal insert, and having a generally radial shank having longitudinal fins protruding therefrom so as to limit movement of spikes relative to the tire.

The present invention has as its object improvements in pneumatic tires for vehicles, with non-skid members, in which holes are formed at appropriate points of the tread of the tire, for subsequent, permanent or temporary, reception of bolts or the like, which are made of metal, plastic or other materials and into which are set spikes or the like, the said spikes preferably extending radially to the axis of the tire, and made of hard metal, sintered metal, or the like. The said bolts may alternatively consist of a wear-resistant steel so as to constitute the spike and so that an insert of hard metal is unnecessary.

It is known that non-skid members or spikes which are set into the tire tread in the radial direction, are made to undergo considerable deflection from the radial direction by transmission of braking force. It is also known that an appreciable proportion of braking force is received by the said spikes in the form of heat, and that this heat alters the area surrounding the said spikes, so that the shanks of the said spikes become loose in the rubber and finally lie obliquely in their sockets or seats, thus reducing their braking action considerably. The said socket or seat carrying the said spike is exposed to stresses caused by the rolling and kneading action engendered by acceleration or deceleration of the vehicle.

It is a feature of the invention that the shanks of the said spikes are endowed with relatively high longitudinal fins on their outer side, extending relatively far from the securing flange, and that the said integral or composite spikes are so arranged in their rubber seats that the bearing surface of the said spike is increased considerably in their rubber seats or sockets during braking action, by virtue of the said longitudinal fins. Whereas the preponderantly cylindrical shanks of conventional spikes can easily displace the opposing volume of rubber during a braking action, the relatively great surface area of the said outer fins extends predominantly at right angles to the direction of travel and bears against the rubber within the said seat or socket.

The resistance against displacement of a surface at right angles is approximately four times greater than that of a cylindrical unit. Since the said spikes endowed with external longitudinal fins are much less liable to yield to braking force, the said external longitudinal fins increase the braking effect and reduce the working caused by rolling. These actions are assisted by thus displacing the point of attack of the braking action along the spike towards the road surface, by virtue of the relatively great rib surfaces along the shanks of the said spikes. These lateral fins are appropriately set back slightly inwards relative to the periphery of the securing flange, to ensure that the periphery of the said securing flange is embedded in a full rubber ring. Instead of an elliptical securing flange with longitudinal fins along the shank, one may equally endow a circular securing flange with two high external fins for example. If more than two high external fins are formed externally on the said shank, it may be advantageous for the longitudinal extension of the said external fins to be such that their extremities are still situated within the tread even when the latter has been worn down.

The said longitudinal fins moreover exert considerable resistance against twisting forces on the said spikes, which act laterally on the said spikes on a skidding vehicle.

The arrangement incorporating two longitudinal bearing fins on the shanks of the said spikes is particularly advantageous for production in a moulding press or forging press employing a split mould or forging die. The two external fins specified may have an area of transition to the base surface of the said shanks, so that both merge into an elliptical form. If the said shanks consist of sintered pressings or mouldings, castings or the like, there is no difficulty in forming more than two bearing fins on the said shanks, so that two additional fins may be formed thus imparting great resistance against lateral deflection to the said spikes even against braking forces acting laterally to the direction of travel, so that the vehicle is less apt to incur "snaking."

The present invention will now be described with reference to the accompanying drawings, which show forms of embodiment of the said non-skid members, but in no restrictive sense.

Figure 1:
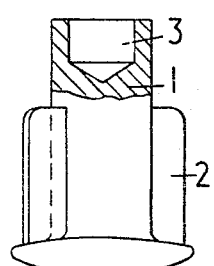
FIGURES 1 to 3 illustrate a non-skid member comprising external longitudinal fins, in two lateral views and in plan view.
Figure 3:
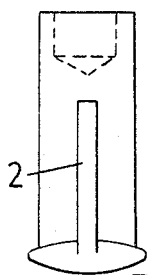
Figure 5:
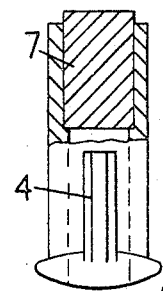
FIGURES 4 and 5 illustrate external longitudinal fins enlarged on the said shank.
Figure 2:
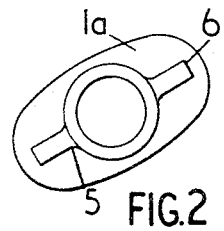
Figure 4:
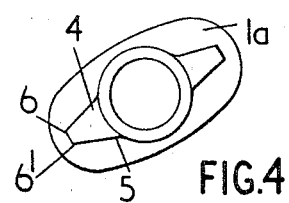
Figure 7:
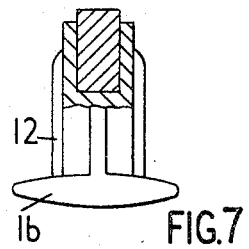
FIGURES 7 and 7a show a non-skid member comprising 3 external longitudinal fins and a circular securing plate.
Figure 6:
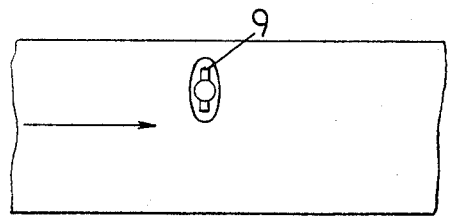
FIGURES 6 and 6a show a non-skid member, preferably comprising two external longitudinal fins, arranged in the tire.
Figure 7A:
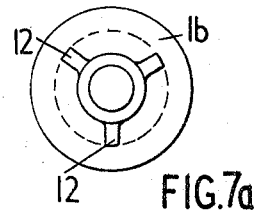
Figure 6A:
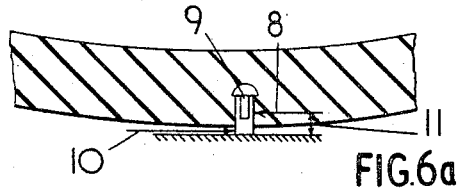

Two external longitudinal fins 2, which may easily be produced by means of a split mould or die, are formed on the shank 1. The end face or tip of the spike exposed to wear on the road surface may comprise a bore 3 in manner known per se, whether a hard metal core is inserted, or whether the said shank itself is made of wear-resistant steel. So that better contact may obtain between the rubber seat and the said shank, the longitudinal fins 4 are widened at 5 at the point of transition to the shank, and the correspodning external edges 6 and 6' of the longitudinal fins may be rounded off. For reception of a hard core 7, the two external fins 4 are shortened as can be seen from FIGURE 5. FIGURES 6 and 6a demonstrate the great resistance against working by rolling of the fins 9, acting along the minor elliptical axis of the flange or head 1a and within the tire surface, whereas the braking force 10 acts on the road surface at the extremity of the non-skid member. The distance 11 of the rolling resistance is of importance in respect of the magnitude of the angular deflection of the longitudinal axis of the said non-skid member, determining the magnitude of the transmissible braking force or accelerative force. The braking action diminishes as the angular deflection increases. Especially in the case of an annular flange 1b, the fins 12 according to FIGURES 7 and 7a offer sufficient displacement resistance against all sides, so that such spikes may be inserted in any optional angular position. In production, it may be advantageous to form the fins by folding, as in a drawing process, and to force the hard metal core into the boss formed between the folds.

Figure 8:
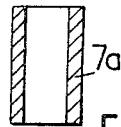
FIGURES 8, 8a and 9, 9a show two different forms of embodiment of a hard metal insert.
Figure 9:
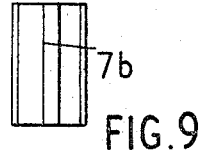
Figure 8A:
Figure 9A:

In order to exploit the advantage of the great resistance prevailing in rubber in the case of a spike comprising high external longitudinal fins, the hard core may be made in the form of a cylindrical tube 7a according to FIGURES 8 and 8a, which engenders an increase in braking action, and/or this tube may be endowed with external longitudinal fins 7b according to FIGURES 9 and 9a, so that the seat or socket bears on parts of the area of the hard core, only. The tubular form last specified reduces transmission of braking heat from the hard core to the seat or socket, so that re-vulcanisation of the surrounding rubber layer may be omitted.

I claim:

1. In an anti-skid element for insertion in a hole in a vehicle pneumatic tire, the element comprising a head, a shank and a wear resistant tip on the shank and adapted to protrude from the tire; the improvement that the shank has at least two high external fins running longitudinally thereof.

2. In a vehicle pneumatic tire having a tread with holes formed therein, anti-skid elements inserted in the holes, the elements each comprising a head, a shank and a wear resistant tip prodruding radially from the tire; the improvement that the shank of each element has at least two high external fins running longitudinally thereof and generally radially of the tire.

3. A vehicle pneumatic tire as claimed in claim 2, in which the said external longitudinal fins terminate with the tread of the tire.

4. An anti-skid element as claimed in claim 1, in which the said external longitudinal fins extend a smaller distance from the shank than the said head.

5. An anti-skid element as claimed in claim 1, in which the said external fins extend along the entire length of the said shank.

6. An anti-skid element as claimed in claim 1, in which the said external longitudinal fins terminate before the extremity of the said shank extending towards the road surface.

7. A vehicle pneumatic tire, as claimed in claim 2, in which the said head has an elliptical base area and is situated with the major axis of the ellipse transversely to the direction of travel, and the said external fins extend parallel with the major axis of the elliptical base area.

8. An anti-skid element as claimed in claim 1, in which the tip is a hard metal insert of tubular form having at least three external longitudinal fins.

References Cited

UNITED STATES PATENTS 2,627,888   2/1953   Bull _____ 152—210

FOREIGN PATENTS 1,202,156   9/1965   Germany.

DRAYTON E. HOFFMAN, *Primary Examiner.*

CHARLES B. LYON, *Assistant Examiner.*